Oct. 8, 1929.   M. CASTRICUM ET AL   1,730,560
AUTOMATIC CUTTING DEVICE
Original Filed Nov. 13, 1925   2 Sheets-Sheet 2

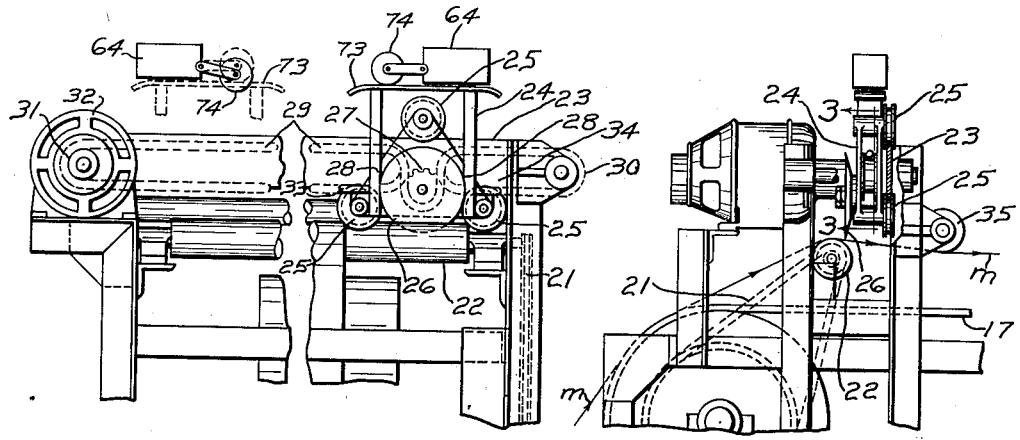

INVENTOR.
Martin Castricum
Percy L. Butterfield
BY
Edward Taylor
ATTORNEY.

Patented Oct. 8, 1929

1,730,560

UNITED STATES PATENT OFFICE

MARTIN CASTRICUM AND PERCY L. BUTTERFIELD, OF SPRINGFIELD, MASSACHUSETTS, ASSIGNORS TO THE FISK RUBBER COMPANY, OF CHICOPEE FALLS, MASSACHUSETTS, A CORPORATION OF MASSACHUSETTS

AUTOMATIC CUTTING DEVICE

Original application filed November 13, 1925, Serial No. 68,839. Divided and this application filed April 22, 1927. Serial No. 185,742.

This application is a division of our prior application Serial No. 68,839, filed November 13, 1925.

Our present invention relates to devices for cutting web material, such as fabric which has passed through a rubberizing calender. It has for one object the automatic control of the cutting mechanisms so that the cutting of the stock may take place without stoppage or slowing down of the rubberizing calender or other equivalent device. It has for another object the improvement of the cutting mechanism, particularly in the interests of simplicity and of reliability in operation. Other and further objects will appear from the following description and claims.

Referring to the drawings,

Fig. 1 is an elevation of a cutting mechanism constructed in accordance with our invention;

Fig. 2 is a side view thereof, partly in section;

Fig. 3 is a detail on an enlarged scale of parts shown in Fig. 1, taken on line 3—3 of Fig. 2;

Fig. 4 is a wiring diagram of the control devices;

Figure 5:
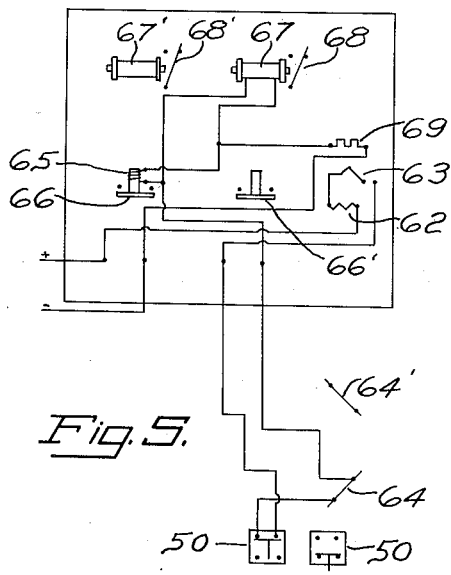
Fig. 5 is a similar diagram showing the initial energizing of the control circuits for the cutter.

The web m to be cut is carried to the cutting and winding devices by a belt conveyor 17. Positioned above this conveyor, and driven from the latter by a chain connection 21, is a roll 22 which holds the web off the conveyor to allow the cut to be made without injury to the belt. The sprockets driving this roll, and the diameter of the roll itself, are designed so that its surface speed is slightly less than the surface speed of the belt. This proportioning of the parts has a function useful in preventing wrinkling of the stock after the cut is made.

Slightly beyond the roll 22 is a guide or track 23 extending transversely of the conveyor to points well beyond the edges of the web $m$. A carriage 24 runs on this guideway by means of grooved rollers 25. A cutter 26 in the form of a circular disc is pivoted for rotation on this carriage, and has fixed to it a sprocket 27. Idle sprockets or rolls 28 are also journaled on the carriage, and direct around the sprocket a chain 29. This chain passes around an idle sprocket 30 at one end of the guideway and at the other around a sprocket 31 on the shaft of a motor 32, being secured at each end, as at 33 and 34, to the carriage 24. As the motor 32 rotates in one direction or the other, the carriage 24 will be moved rapidly from one end to the other of the guideway and the cutting disc simultaneously rotated at a high speed.

After passing the plane in which the cutting disc moves, the web $m$ passes under an idle roll 35 which serves to keep it in proper position, and finally reaches the winding devices. The details of these winding devices are not material to the present invention, but a complete mechanical description of one suitable form is found in our prior application Serial No. 20,398, filed April 3, 1925.

The cutting mechanism has been arranged so as to operate very quickly, avoiding any necessity of slowing down or stopping the calender. The movement of the web past the cutter is temporarily arrested, the slack between that point and the calender being taken up by any suitable device. The entire manual control of the cutter and of the motion of the stock is centered in the two push buttons 50 and 50' (Fig. 4), these being used alternately. Power from the main line is admitted to the control device by a switch 59, here shown as of a conventional double pole type but in practice generally an automatic part of a more complex wiring system linking the cutter motor to the web forming and winding devices. A description of this system appears in our application Serial No. 68,839, filed November 13, 1925, of which the present case is a division. The electrical control devices will now be considered in the sequence in which they operate.

Tracing the path of the current from the positive side of the line (see Figs. 4 and 5) it passes first through the resistance 62 of a temperature control device of standard construction, through the contactor 63 thereof, through the now closed circuit between the upper contacts of the push button 50 (which is being held depressed by the operator), through a limit switch 64, and then divides, part passing through the solenoid 65 of a contactor 66 and part through the coil 67 of a contactor 68. The current finally passes through a ballast resistance 69 and back to the negative side of the line. This condition of the circuit is shown in Fig. 5, other parts and portions of the circuit being omitted for purposes of clearness.

The actions just described merely prepare the way for the circuit through the cutter motor 32. This latter circuit is shown separately in Fig. 6, it being understood that the current in the control circuits of Fig. 5 persists during the operation. Considering the operating circuits of Fig. 6 separately from the control circuits of Fig. 5, the current from the positive side of the line passes through the resistance 62 and through the armature of the contactor 68, which it will be recalled has been shifted to the left, as viewed in the drawings, by the energizing of its solenoid. It then passes through the armature 70 of motor 32, through the unenergized armature of a contactor 67', similar in construction to contactor 67, through the closed contactor 66, which was energized by the control current, through a ballast resistance 71, and back to the negative side of the line. The field coils 72 of the motor 32 are shunted across the line. For convenience in referring to the reversing of motor 32 the path of the current from positive to negative has been shown by arrows.

Figure 6:
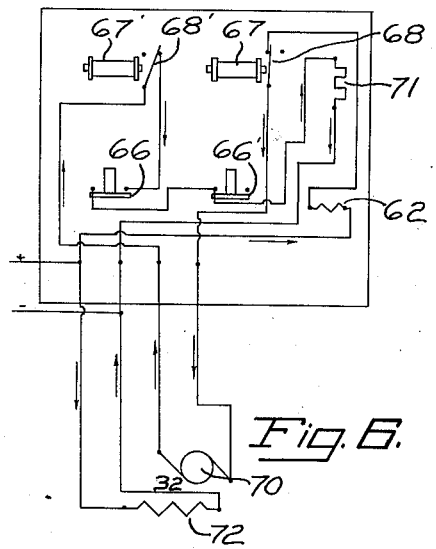
Fig. 6 is a similar diagram showing the energizing of the cutter motor operating circuits.
Figure 7:
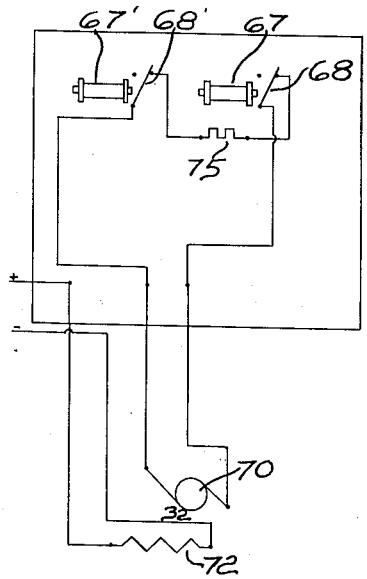
Fig. 7 is a similar diagram showing the operation of the dynamic brake circuit for bringing the cutter motor to a stop.

When current flows as indicated in Fig. 6 the motor 32 will turn, moving chain 29 and causing the carriage 24 to be moved across the path of the web $m$, with a consequent rotation of the cutter and severance of the web. When the carriage nears the limit of its travel a rail 73 (Fig. 1) borne by it strikes the actuating roll 74 of the limit switch 64. The actuation of the limit switch breaks the control circuit shown in Fig. 5 in the same way as if the operator had removed his hand from the push button 50 at exactly the right moment of time, and restores the motor operating circuit to the condition shown in Fig. 4. The operating circuit has been isolated in Fig. 7 to show more clearly the action which takes place. It will be apparent from Fig. 7 that the armature of the cutter motor 32 is short circuited through a resistance 75, while the field coils are still energized from the main line. This action, commonly referred to as dynamic braking, brings the motor 32, and consequently the cutter carriage 24, to an almost instantaneous though smooth stop.

Figure 8:
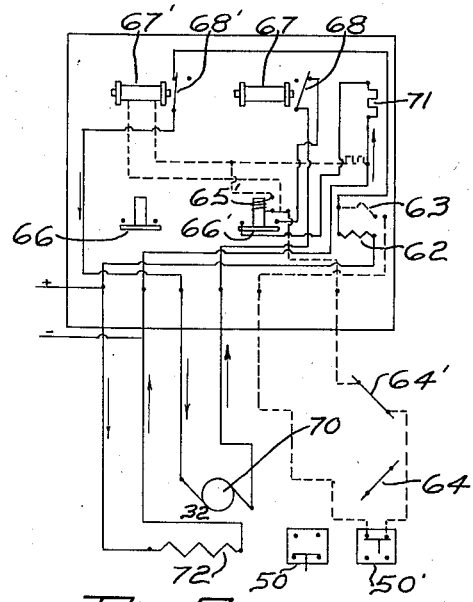
Fig. 8 is a view similar to Figs. 5 and 6, but showing the alteration incident to operating the motor in the reverse direction, the control circuits being shown in dotted and the operating circuits in full lines.

The next cut is brought about by the operator pressing the button 50', buttons 50 and 50' being used alternately. The action is exactly similar to that produced as above except that the contactors 66' and 68' are used instead of the corresponding ones 66 and 68, and that the current flows through the armature of the cutting motor in a reverse direction, causing reversal of the motor travel. This has been shown in Fig. 8, the control circuit being shown in dotted and and the operating circuit in full lines.

While the specific electrical devices chosen have been described with some particularity in the interest of clearness, it should be understood that other connections or types of apparatus may be used as desired by the installing electrician. The apparatus is not restricted to winding up material delivered from a rubberizing calender, but may be used wherever a supply of continuous web material needs to be cut into lengths.

Having thus described our invention, we claim:

1. A cutting mechanism comprising a driven sprocket, an idler sprocket, a carriage mounted for sliding between the sprockets and having rotatably mounted thereon a circular cutter, a sprocket operatively connected to the cutter, and a chain passing around said three sprockets, and attached at each end to the carriage.

2. A cutting mechanism comprising a driven sprocket, an idler sprocket, a carriage mounted for sliding between the sprockets and having rotatably mounted thereon a circular cutter, a sprocket operatively connected to the cutter, a chain passing around said three sprockets, and attached at each end to the carriage, an electric motor driving the driven sprocket, means for energizing said motor for rotation in either direction, and means actuated by the approach of the carriage to its limit of motion in either direction for exerting a dynamic braking effect on the motor.

MARTIN CASTRICUM.
PERCY L. BUTTERFIELD.